April 7, 1931. H. H. SEAMAN 1,799,870
SHIFTABLE SEAT
Filed June 6, 1928  2 Sheets-Sheet 2
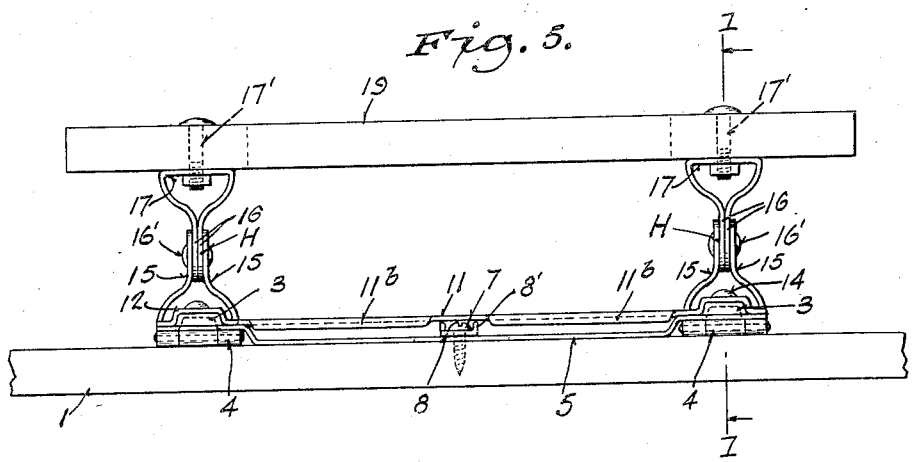
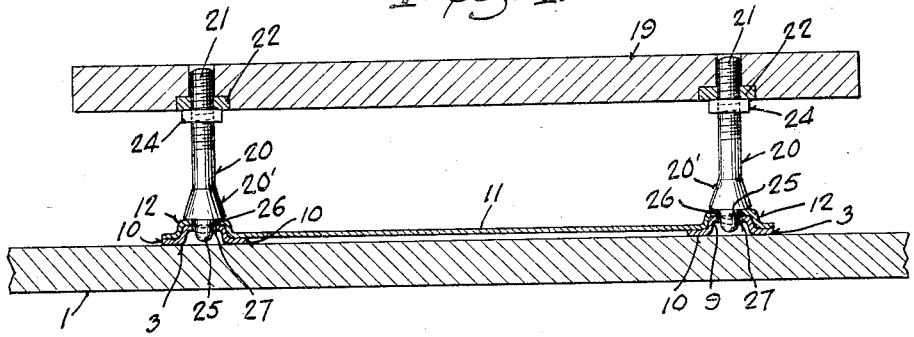
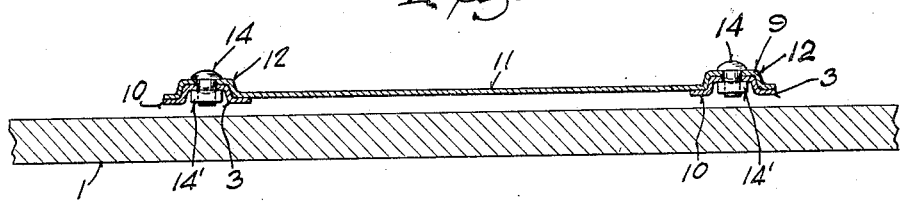
INVENTOR.
HAROLD H. SEAMAN
BY
ATTORNEYS.

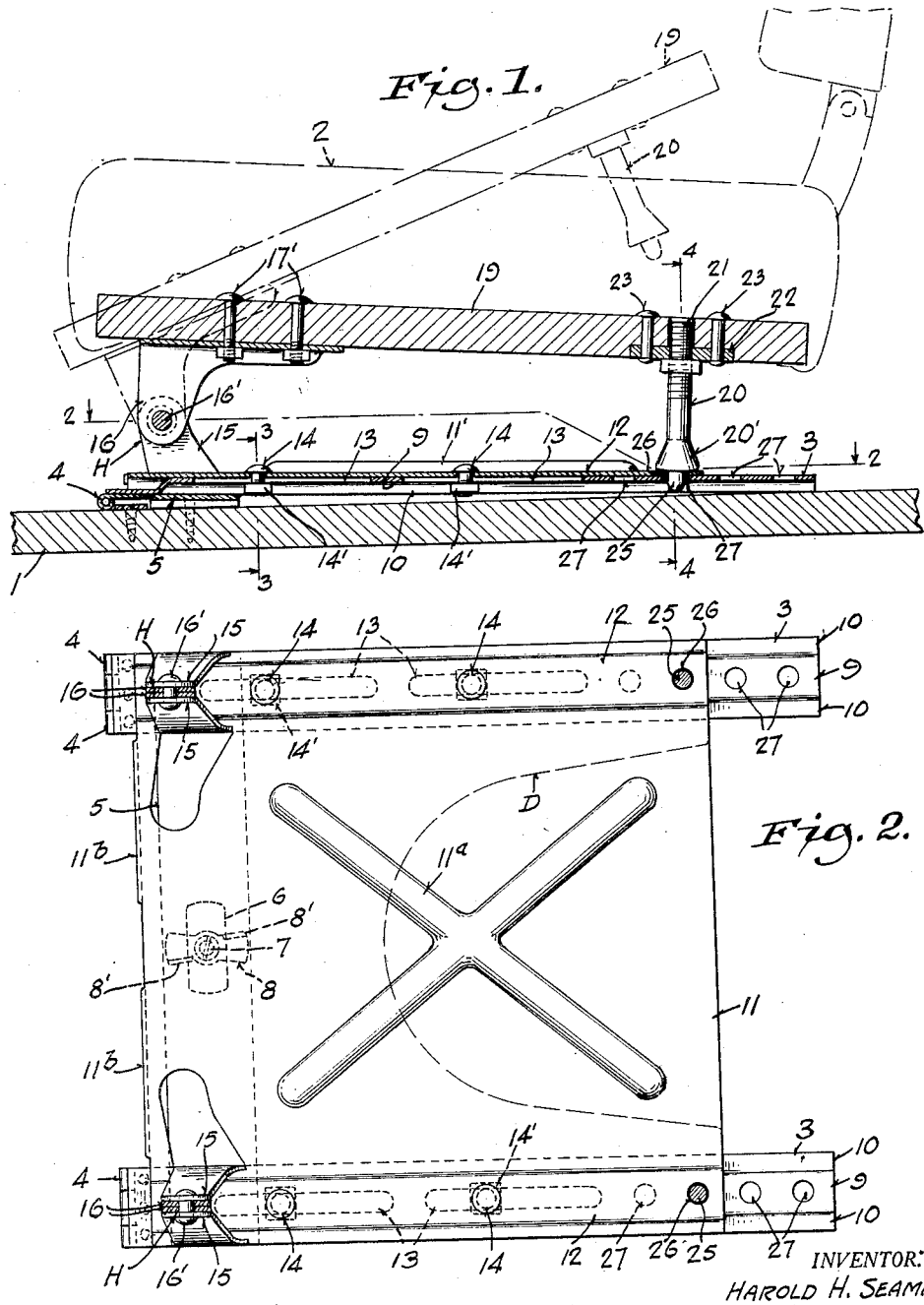

Patented Apr. 7, 1931

1,799,870

UNITED STATES PATENT OFFICE

HAROLD H. SEAMAN, OF MILWAUKEE, WISCONSIN, ASSIGNOR TO SEAMAN BODY CORPORATION, OF MILWAUKEE, WISCONSIN, A CORPORATION OF WISCONSIN

SHIFTABLE SEAT

Application filed June 6, 1928. Serial No. 283,256.

This invention relates in general to vehicle seats and more particularly to a shiftable vehicle seat especially designed and adapted for use with automobiles.

In certain types of automobile bodies, such for example, as the coach and two-door sedan, the driver's seat and the other front seat are usually hinged to the floor or equipped with a hinged or forwardly foldable back, to permit occupants of the rear seat to enter and leave the rear compartment of the vehicle. Such construction makes it necessary for the driver or the occupant of the other front seat to get out of the vehicle to permit folding or swinging of one of the front seats when anyone enters or leaves the rear compartment. This is, of course, a source of no little annoyance, inconvenience and loss of time.

One of the principal objects of the present invention is to provide a front seat construction for use in automobiles of the type mentioned whereby the occupant of either front seat may shift his seat forwardly by appropriately swaying or shifting his body forwardly and without leaving his seat, the occupant of the front seat returning it to its normal position by a rearward shifting of his body. Of course, the invention is not restricted in its application to any particular type of automobile body or to any particular location.

Another important object of the invention resides in the provision of a tiltable and slidable seat in conjunction with releasable locking means automatically operating to maintain the seat against sliding movement at all times except when it is tilted forwardly by the occupant of the seat. Preferably this releasable locking means also acts to support the rearward portion of the seat in its normal position.

Another object of prime importance resides in the provision of a vehicle seat which may be swung or folded forwardly in any position or adjustment of the seat. For example, when the seat is adjusted forwardly to accommodate persons of smaller stature, it may be swung or folded forwardly without disturbing the adjustment.

Another object of the invention is to provide a shiftable vehicle seat having these advantages and capacities and which is of simple and durable construction, reliable and effective in operation and easily and comparatively inexpensive to manufacture and install.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary view partly in vertical longitudinal section taken on line 1—1 of Figure 5 and partly in side elevation showing a shiftable seat constructed in accordance with the present invention;

Figure 2 is a view in horizontal section on line 2—2 of Figure 1.

Figures 3 and 4 are views in transverse vertical section on lines 3—3 and 4—4, respectively, of Figure 1; and Figure 5 is a view in front elevation of the seat supporting and mounting structure shown in Figure 1.

Referring to the drawings, the numeral 1 designates generally the floor of an automobile body and the numeral 2 designates generally one of the front seats, which, as is well known, is usually located in approximately transverse alignment with the door openings of the body. The present invention proposes the provision of a pair of floor guides 3 extending parallel to each other and lengthwise of the vehicle, the floor guides having their forward ends connected by hinges 4 to the floor of the vehicle body, one leaf of each hinge being welded or otherwise suitably secured to the forward end of its floor guide and the other leaf thereof being fastened by screws or the like to the floor boards. Under some circumstances it may be desirable to releasably hold the floor guides against upward swinging movement about their hinges 4 and where it is desirable to accomplish this purpose, a transverse lock strip 5 is carried by the floor guides 3 adjacent the hinges and may be welded or otherwise suitably secured to the floor guides. At its center the strip 5 is formed with a slot 6 through which a screw 7 extends, the screw 7 being threaded into the floor boards and carrying a locking member or nut 8. The locking member 8 is swivelled on the screw 7 and when it is turned into alignment with the slot 6 it drops into the slot and the guides may be freely swung upwardly about their hinges 4. The locking member 8 has wings 8' facilitating its manipulation and permitting the locking member to be raised up through the slot 6 and then turned to a position where it straddles the slot and engages the top of the lock strip 5 as shown in dotted lines in the Figure 2, thereby holding the strip 5 and the guides 3 against swinging movement about their hinges 4.

The guides 3 for the major portion of their length have the form of inverted and flanged channels which open downwardly toward the floor boards, the body portions of the channels being designated at 9 and their angular side flanges at 10. A seat carrier or support 11 is provided and consists of a metal plate which is suitably ribbed and flanged as at 11a and 11b to impart stiffness and strength thereto. This plate may be cut out along the dotted line D to lighten the assembly. Along its opposite sides the carrier 11 is formed with channel guide ways 12 which receive the floor guides 3. By virtue of these interfitting channels on the floor guides 3 and on the seat carrier 11, the carrier is held against lateral displacement, but is free to slide longitudinally on the floor guides. To prevent vertical displacement of the carrier and to limit its longitudinal sliding movement the floor guides are provided with spaced lengthwise slots 13 receiving guide studs 14 which pass through and snugly fit in openings provided therefor in the channel portions 12 of the seat carrier 11. The heads of the stud 14 engage the carrier 11 and on the shanks thereof nuts 14' are threaded, the nuts operating in the channels of the guides 3 and being held against displacement thereby. The studs 14 engage the end walls of the slots 13 to limit the longitudinal sliding movement of the carrier 11. The structure so far described constitutes the mounting for slidably supporting the seat on the floor of the vehicle.

The forward end of the seat 2 has a hinged mounting, designated generally at H on the carrier 11 and for this purpose brackets are provided on the carrier and seat, respectively. The brackets on the carriers comprise two pair of hinge ears 15 integrally formed with the carrier 11 adjacent its forward end, the hinge ears being struck from the same blank as that from which the carrier is formed and extending upwardly from the carrier as shown in Figures 2 and 5. One pair of hinge ears is located adjacent each side of the carrier near the forward end thereof and between the members of each pair of hinge ears 15, hinge ears 16 which constitute the brackets on the seat are received and pivotally secured by means of hinge pins 16', the hinge ears 16 being formed on and extending downwardly from brackets 17 secured as by bolts and nuts 17' to the under side of the base or frame 19 of the seat 2. In this way the forward end of the seat is hingedly supported on the carrier well above the floor and adjacent the forward end of the carrier, but rearwardly of the hinged connection between the floor guides and the floor. Irrespective of the adjustment of the carrier 11 on the floor guides 3, there is always adequate clearance between the forward end of the seat 2 and the underlying structure to permit the seat 2 to be swung or folded forwardly. This advantage results from the pivotal mounting of the seat 2 on the adjustable carrier 11 as described.

Adjacent the rearward ends of the seat, and at the opposite sides thereof, a pair of supporting legs 20 are provided and have their shanks threaded as at 21 and engaged with internally threaded openings provided therefor in mounting plates 22 embedded in the base 19 of the seat and secured in position by rivets 23 (see Figure 1). Lock nuts 24 threaded on the legs 20 engage the plates 22 to maintain the adjustments of the legs. These legs 20 not only serve to support the rear end of the seat but they also take part in the fastening of the seat against sliding or shifting movement when the seat is in normal position. For this purpose, the enlarged lower ends 20' of the legs 20 have reduced extensions or studs 25 integrally formed therewith and extending through openings 26 formed in the channel-shaped portions 12 of the carrier when the seat is in its normal position. The body portion 9 of each floor guide 3 is provided with longitudinally spaced keeper openings 27 with which the openings 26 selectively register. The locking studs or bolts 25 formed at the lower ends of the legs 20 are long enough to extend not only through the openings 26 but also through any of the openings 27 that may be registered with the openings 26. Obviously, when the studs 25 extend through registered openings 26 and 27 they lock the carrier 11 and the floor guides 3 against relative sliding movement or against relative longitudinal shifting movement until the seat is tilted to swing the legs 20 and their studs 25 up away from the carrier 11 and the floor guides 3, thereby moving the studs 25 out of the openings 26 and 27.

With the seat pivotally supported at its forward end in the manner show and described and the carrier 11 for the seat locked against sliding movement by the legs 20 at the rear of the seat, the occupant of the seat may effect shifting thereof without leaving the seat and merely by swinging the body forward to swing the rear end of the seat upwardly about the hinges H and then urging the body forwardly to slide the seat 2 and carrier 11 longitudinally and forwardly along the floor guides 3 to such extent as to permit an occupant of the rear compartment to leave the vehicle or to permit a person to enter the rear compartment through the door opposite the shiftable seat. The occupant of the shiftable front seat may also return the seat to its normal position by simply urging his body rearwardly and permitting the seat to swing about its hinges H until the studs 25 have locking engagement with the openings 26 and 27 brought into registration.

If it is desired, the entire seat assembly and mounting including the carrier 11 may be swung upwardly and forwardly about the hinges 4 to permit of access to and removal of the floor boards. But ordinarily any forward folding or collapsing of the seat 2 is effected about the hinges H which as described permit such folding in any adjustment of the seat 2 on the carrier 11.

I claim:

1. A shiftable vehicle seat comprising floor guides hingedly connected to the vehicle, a carrier slidably connected to the floor guides, a seat having its forward end hinged to and spaced above the forward portion of the carrier, legs carried by the rearward portion of the seat and engageable with the carrier for spacing the rear end of the seat above the same, said carrier and said floor guides having registering openings in which the legs engage in the normal position of the seat to lock the carrier against sliding movement at such time, said legs being disengaged from the openings when the seat is tilted forwardly.

2. A shiftable vehicle seat comprising floor guides hingedly connected to the vehicle, a carrier slidably mounted on said floor guides, a seat spaced above and pivotally supported on said carrier, means controlled by the tilting of the seat for locking the carrier against or releasing the carrier for sliding movement, and releasable means holding the floor guides against pivotal movement.

3. In combination, channel shaped floor guides, a carrier having channel shaped guide ways receiving said floor guides, means for holding said guides and guideways interfitted and for limiting the relative sliding movement of the carrier and floor guides, a seat spaced above the carrier and having its forward end hinged to the carrier in the space between the same and the seat, and legs at the rearward end of the seat having locking studs, said guides and guideways having registering openings receiving said studs when the seat is in normal position.

4. A shiftable seat for use in a vehicle, comprising a seat and a mounting therefor adapted to be secured to the floor of the vehicle to slidably support the seat thereon, hinge means at the front of the seat and latch means at the rear of the seat for connecting the seat with the mounting and supporting the seat above the mounting in vertical spaced relation thereto, said hinge means having its axis in the space between the mounting and the seat and offset rearward from the front edge of the seat whereby the seat may be readily and easily tilted back and forth by the body movement of the occupant of the seat to release the latch means to provide for shifting the seat, said latch means being carried by the seat and engageable with the mounting to hold the seat when in normal position against shifting movement.

5. A shiftable seat for use in a vehicle, comprising a seat and a mounting therefor having guides adapted to be secured to the floor of the vehicle, a carrier extending between and slidably mounted on said guides, brackets carried by the seat and the carrier adjacent their front ends and legs carried by the seat adjacent its rear end, said brackets and legs extending between the seat and the carrier and spacing the seat above the same with the legs having interlocking engagement with the guides at such time, and hinge means connecting the brackets together in the space between the seat and the carrier whereby the seat may be tilted to carry the legs into and out of locking engagement with the guides to permit shifting of the seat when in tilted position and prevent shifting of the seat when in normal position.

In witness whereof, I hereto affix my signature.

HAROLD H. SEAMAN.